Figure 3:
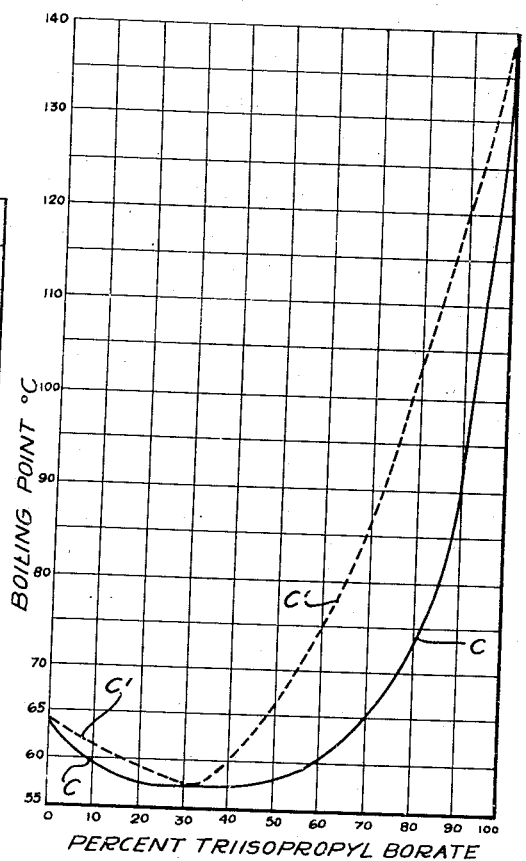

Nov. 11, 1941.  A. R. LYTLE ET AL  2,262,187
VOLATILE WELDING FLUX
Filed Jan. 10, 1939

INVENTORS
THOMAS H. VAUGHN
ARTHUR R. LYTLE
BY
ATTORNEY

Patented Nov. 11, 1941

2,262,187

UNITED STATES PATENT OFFICE 2,262,187

VOLATILE WELDING FLUX

Arthur R. Lytle and Thomas H. Vaughn, Niagara Falls, N. Y., assignors to Union Carbide and Carbon Research Laboratories, Inc., a corporation of New York Application January 10, 1939, Serial No. 250,140

20 Claims. (Cl. 148—23)

This invention relates to fusion welding and brazing operations in which gaseous fuel is used. Among its more important objects are the provision and use of certain novel welding and brazing fluxes adapted, when suitably introduced into a stream of a welding gas flowing to a welding zone, to impart to the welding flame a powerful and readily controlled uniform fluxing action. The novel flux compositions of the invention are relatively volatile compounds or mixtures comprising essentially the lower alkyl borates, the fluxing action being derived principally from boric oxide formed by the decomposition in the flame of these volatile borates.

It is already known that upon bubbling acetylene through a mixture formed by contacting denatured alcohol with an excess of solid boric oxide, a mixture of the alcohol and the ethyl borate thus produced is picked up by the acetylene and imparts to the welding flame a decided fluxing action. This procedure has been used with some success in the welding of nickel and "Monel" metal. Such a mixture contains the following components, certain of which continuously are interacting in variable degree:

(1) Solid boric oxide;
(2) Solid boric acid; and
(3) A homogeneous liquid containing varying amounts of ethyl borate, ethanol, dissolved boric acid and oxide, water, and various denaturants.

However, this method of imparting a fluxing action to a welding flame presents certain disadvantages which it is an object of the present invention to overcome. The chemical reaction $3C_2H_5OH + B_2O_3 \rightleftarrows (C_2H_5)_3BO_3 + H_3BO_3$, by virtue of which the ethyl borate is formed in the above-mentioned mixture, converts half of the boron oxide to ethyl borate and the other half to boric acid. The boric acid reacts with excess ethanol present, yielding ethyl borate and water by a reversible reaction $3C_2H_5OH + H_3BO_3 \rightleftarrows (C_2H_5)_3BO_3 + 3H_2O$ The boric acid formed, being comparatively insoluble in the reaction mixture, forms a voluminous precipitate which, upon evaporation of the volatile components of the mixture during use, soon produces a thick slurry which clogs the dispensing apparatus, and through which it is impossible to pass welding gas flowing under low pressures.

The amount of ethyl borate picked up by the welding gas from such mixture of reactants varies with the temperature of the latter. The reaction equilibrium shifts with changes in temperature. Moreover, the reaction rate is so slow that any ethyl borate removed from the mixture is replaced slowly. This limitation as to the rate of ethyl borate generation becomes serious when a welding gas is passed through such mixture at the higher flow rates; and non-uniform fluxing action results when a plurality of intermittently-operating welding torches are supplied from a single source of flux supply, whereby the flow rate of the welding gas through the alkyl borate-generating mixture varies widely. As a result of these various influences, it has been found that if the welding gas is bubbled through any practicable reaction mixture generating ethyl borate in such manner as to pick up enough ethyl borate to impart an adequate fluxing action to the welding flame, the concentration of borate in both the reaction mixture and the welding gas fluctuates continuously. It has further been discovered that even when these ethyl borate-generating mixtures are maintained at a constant temperature, the amount of active flux picked up by a welding gas passed therethrough at a constant rate varies widely throughout the life of the flux under the influences of such factors as changing rates of borate production and of ethanol consumption, and changes in dissolved boric acid content of the solution.

For all these reasons, volatile fluxes heretofore known are not in general satisfactory for imparting fluxing action to welding flames, and have, in fact, only been used in welding nickel and "Monel." On the other hand, the use of volatile fluxes is, in principle, extremely advantageous in many gas welding and brazing operations. The fluxing action of boric oxide derived from volatile boron compounds has many desirable features. Thus it provides for the production of clean welds free from the solid glassy encrustations left on the work by the usual solid and liquid fluxes which necessarily are employed in considerable excess and are incapable of being applied with the uniformity of applicants' fluxes.

The present invention provides volatile welding fluxes of novel composition which are free from the disadvantages described, and which present many advantages, as will appear hereinafter.

We have discovered that certain distilled lower alkyl borates, such as the methyl, ethyl and isopropyl borates, may be used alone with manifest advantage as volatile welding fluxes by passing a welding gas into contact with a body of the liquid flux. The distilled higher alkyl borates also may serve but, because of their low vapor pressures at atmospheric temperature, it usually is necessary to heat them while contacting the welding gas therewith. Alkyl borates purified by distillation to isolate the non-distillable substances, such as boric acid, oxide, etc., may be used effectively in the process. The presence therein of small amounts of volatile combustible impurities does not interfere with the use of these fluxes. Preferably, the welding gas is dried prior to contacting it with the liquid flux, in the interests of flux economy and of fluxing uniformity. In so far as we know, pure alkyl borates never previously have been used as volatile welding fluxes.

It further has been discovered that a strong and uniform fluxing action may be imparted to a welding or brazing flame by passing part or all of the welding gas flowing thereto into contact with an at least approximately azeotropic mixture or solution of a lower alkyl borate, such as trimethyl borate, and an organic solvent for the borate capable of forming therewith such azeotropic compositions of substantially constant composition. Among such solvents may be mentioned methanol and ethanol; certain ketones, such as acetone and methyl isobutyl ketone ("hexone"); certain chlorinated solvents, such as perchlorethylene; and various other solvents, such as acetonitrile. Both the distilled alkyl borates per se and the at least approximately azeotropic mixtures thereof with volatile organic solvents are relatively inexpensive. The undiluted distilled alkyl borates offer advantages in handling and in use; and each of the fluxes may be completely used up without encountering welding difficulties resulting from flux composition changes or the accumulation of solid nonvolatile matter, particularly when employing dry or approximately anhydrous welding gas.

We further have found that the lower alkyl borates or mixtures of the invention advantageously may, for some purposes, be mixed with other volatile fluxes,—for example, with alkyl silicates such as methyl and ethyl silicate. The silicates decompose in the welding flame, forming $SiO_2$, which enhances the fluxing action of the boric oxide and provides other advantages.

Figure 2:
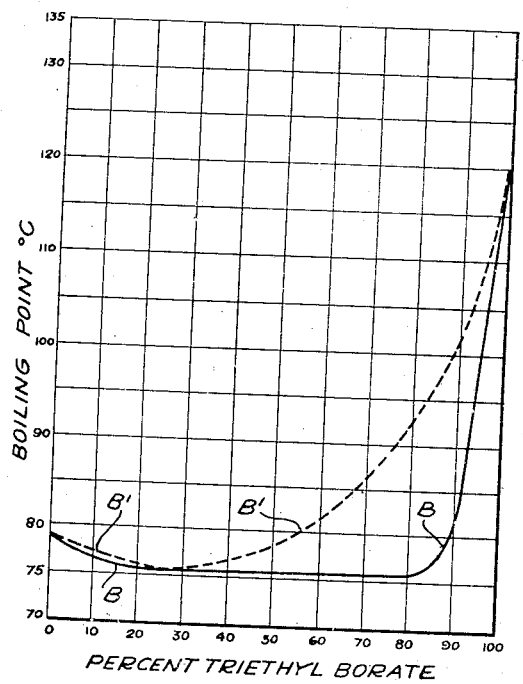
Figure 1:
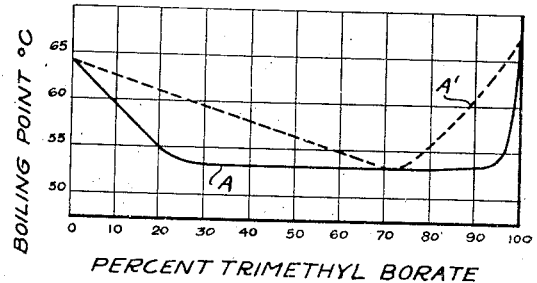

Referring now to the accompanying drawing, in Fig. 1, the solid line A and the dotted line A', respectively, represent boiling point-composition curves for the liquid and the vapor phases of mixtures of trimethyl borate and methanol; in Fig. 2, the solid line B and the dotted line B', respectively, represent boiling point-composition curves for the liquid and the vapor phases of mixtures of triethyl borate and ethanol; and, in Fig. 3, the solid line C and the dotted line C', respectively, represent boiling point-composition curves for the liquid and the vapor phases of mixtures of triisopropyl borate and methanol.

The data of these curves appear with other data in Table 1.

The advantages attendant the use of a flux of constant composition over the use as a flux reservoir of a reaction mixture actively generating the flux, together with water and solid boric acid in varying amounts, will be apparent. The composition of the vapors from the reaction mixture will vary with the rate of the reaction producing the borate, the extent to which the solution is exhausted of one reactant, the temperature of the reaction mixture, and upon other factors.

When an approximately azeotropic mixture of ethyl borate and ethyl alcohol, substantially free from non-distillable solids, or a mixture somewhat richer in borate than the azeotrope, is used as starting material, the vapor picked up by the welding gas has a substantially constant ratio of around 1 part of the borate to 3 parts of alcohol, all by weight.

Comparing the curves of Figs. 1 and 2, certain advantages attendant the use of the methyl alcohol-methyl borate azeotrope become apparent. Whereas the ethyl alcohol-ethyl borate azeotrope contains about 25% of borate and boils at about 76.5° C., the methyl alcohol-methyl borate azeotrope contains about 73% of borate and boils at about 53.5° C. Consequently, the latter is not only much richer in borate and poorer in alcohol than the former azeotrope, but is also vaporized much more readily. We have in fact found that when using this methyl alcohol-methyl borate azeotropic mixture, it is possible to impart adequate fluxing action to a welding flame merely by causing a part or all of the fuel gas to sweep over the surface of a quantity of the mixture contained in a bottle, without bubbling the gas through the liquid. This advantage is more important than might at first appear, for the back pressure of gas in a welding torch is extremely small; and even the variations in hydrostatic pressure which occur when the gas is bubbled through the liquid flux produce undesirable fluctuations in the welding action of the flame.

In the preparation of the volatile fluxes of the invention, it is desirable to employ distilled alkyl borates, and to use dry or substantially anhydrous borates and organic solvents, for several reasons. If the flux composition contains much water, some of the flux is hydrolyzed, forming gelatinous boric acid which tends to deposit in the tiny passages of the blowpipe, clogging them as well as facilitating corrosion. Hydrolysis of borate in the azeotropic composition may deplete the same of that component. It therefore is advantageous, especially when using a welding gas containing some moisture, to use a flux that is somewhat richer in volatile borate than the azeotrope. Thus, in the case of methyl borate and methyl alcohol, we find it advantageous to use a mixture containing about 80% of methyl borate.

*Table 1*

| Mixture | | Boiling point, °C. | | | Composition of azeotrope (by weight) | |
|---|---|---|---|---|---|---|
| Flux | Solvent | Flux | Solvent | Azeotrope | Borate | Solvent |
| | | Degrees | Degrees | Degrees | Percent | Percent |
| $(CH_3)_3BO_3$ | Methyl alcohol | 68 | 64 | 53.5 | 73 | 27 |
| $(C_2H_5)_3BO_3$ | Ethyl alcohol | 120 | 78 | 76.5 | 25 | 75 |
| $(C_3H_7)_3BO_3$ | Methyl alcohol | 140 | 64 | 57.5 | 32 | 68 |
| $(CH_3)_3BO_3$ | Acetone | 68 | 56 | 54.0 | 35 | 65 |
| $(C_2H_5)_3BO_3$ | Methyl isobutyl ketone | 120 | 116 | 112.8 | 47 | 53 |
| $(C_2H_5)_3BO_3$ | Perchlorethylene | 120 | 121 | 117.6 | 46 | 54 |
| $(CH_3)_3BO_3$ | Acetonitrile | 68 | 82 | 62.6 | 83 | 17 |

So far as we are aware, volatile borate fluxes have heretofore been used, only in the welding of nickel and "Monel" metal. We have found that the fluxes of the invention may be used with very beneficial results in the welding or brazing of other metals, such as copper, brass, bronze, low carbon steel, and high chromium ferrous alloys, for example, rustless iron and stainless steel, in the welding of which solid or liquid fluxes are customarily used. Such customary fluxes leave deposits or encrustations on the metal which must be removed before subsequent operations, such as plating or tinning, can be performed; and the encrustations are in many cases exceedingly difficult to remove. In gas-welding or brazing metals of this class, the fluxes of the invention produce exceptionally sound, clean welds which require no preparation whatever prior to plating or tinning.

The following data are indicative of results obtained with bronze welds on steel coupons, with the fluxes of the invention, as compared with other types of fluxes:

Table 2

| Test No. | Flux used | Average tensile strength | Coupons below 56,000 lbs. | Bend elongation |
| --- | --- | --- | --- | --- |
|  |  | Pounds per square inch | Percent | Percent |
| 1 | S | 53,000 | 63 | 20 |
| 2 | A | 54,000 | 27 | 35 |
| 3 | A' | 59,000 | 22 |  |
| 4 | B | 47,000 | 50 | 20 |
| 5 | C | 58,000 | 35 | 35 |
| 6 | D | 59,000 | 32 |  |

The coupons used were flange quality steel having a tensile strength of about 62,000 pounds per square inch; and the welding rod was of typical bronze composition.

The fluxes used were:

S—A standard commercial flux (paste) containing boric acid and borax.
A—A dilute active reaction mixture of methyl alcohol and boric acid, containing about 7.2% by weight of methyl borate.
A'—The same as A, but more concentrated, i. e., containing about 20% by weight of methyl borate.
B—Crude mixture formed by reacting methyl alcohol and boric oxide, and containing about 76% of methyl borate and 6% of boric acid (by weight).
C—Mixture composed of 80% of distilled methyl borate and 20% of methyl alcohol (by weight), prepared by mixing the two distilled ingredients.
D—Distilled isopropyl borate.

The data show that:

(1) Under proper conditions a high percentage of very high strength welds was obtained with the use of volatile fluxes.

(2) The proportion of low strength welds obtained with volatile fluxes used under proper conditions was less than half as great as in the case of standard commercial flux using the best welding technique.

(3) A crude reaction mixture containing 20% of methyl borate in methyl alcohol gave good welding results. However, very large quantities of flux mixture were required in this case; and the brazing operation was difficult because of changes in flux concentration.

(4) A crude relatively concentrated active reaction mixture containing about 76% of methyl borate and 6% of boric acid gave unsatisfactory results.

(5) Excellent results were obtained with: (a) A mixture containing 80% of distilled methyl borate and 20% of distilled methyl alcohol; (b) Distilled isopropyl borate.

While the crude reaction mixtures used in Tests 2 and 3 showed good welding results, it has been shown that such mixtures are rapidly depleted of their borate content; that the proportion of alcohol introduced into the welding flame rapidly becomes objectionable; that constant adjustments are necessary to maintain a required fluxing action; and that large volumes of the flux mixture are required. For these reasons, such fluxing materials are unsuited for continuous use as volatile fluxes.

The reasons for the poor results obtained in Test 4 are not known, but are possibly related to the production of metaboric ester, a phenomenon reported to occur in the reaction mixture used. Whatever the cause, it is apparent that such a crude reaction mixture is inferior as a welding flux to the pure or distilled alkyl borates of the invention, or the mixtures thereof with solvents obtained by the distillation of mixtures of pure or distilled compounds.

The flux mixture used in Test 5 (Table 2) is an especially useful flux, since it combines excellent welding properties with exceptionally high vapor pressure, low alcohol concentration and high boron content; and it can be manufactured from relatively cheap raw materials. It will be noted that this preferred mixture is not precisely the azeotropic mixture, but contains about 80% borate instead of about 74%. As previously mentioned, this mixture has the advantage that it exerts a drying effect upon the welding gas in case the latter contains traces of moisture, the excess borate being hydrolyzed by the moisture to form boric acid and methyl alcohol. At the same time, the vapor picked up from the mixture has substantially the azeotropic composition; and the progression toward pure methyl borate as welding gas is passed over the mixture occurs very slowly, if at all.

It can also be seen from the curve, that if a mixture somewhat richer in borate than the azeotrope is used as a starting point, the vapor evolved will continue to have the azeotropic composition, and the vapor pressure of the liquid will remain constant until the concentration of borate in the liquid rises well above 80%. It is obvious that the azeotrope can then be renewed by suitable addition of alcohol, in order to avoid undue decrease in vapor pressure as the pure borate composition is approached.

In another series of tests, the flux C of Table 2 was successfully used for brazing (by welding), using welding rods composed respectively of brass, "Tobin" bronze, lead bronze, bearing bronze, "Everdur," phosphor bronze, and copper.

While the volatile borate fluxes of the invention are thus satisfactory for a wide variety of purposes, we have found that an admixture of a volatile organic silicate, e. g., methyl silicate, is advantageous in many cases. In the welding of steel, such a mixture increases the fluidity of the weld and facilitates the welding operation, though no material increase in the strength of the weld has been observed. More importantly, the use of a volatile silicate increases the corrosion-resistance of welds made in stainless steel, and inhibits or minimizes zinc fuming in the brazing (by welding) of metals with welding rods containing substantial percentages of zinc.

In a series of tests, stainless steep coupons were welded, using various flux mixtures (see Table 3), through which a part of the welding gas was bubbled; and control welds were made with a standard stainless steep flux (paste). The welded coupons were then submitted to a standard corrosion test in boiling nitric acid. The comparative corrosion-resistance of the welds is set forth in Table 3 in order of decreasing corrosion-resistance:

Table 3

| Flux mixture | Flux composition (by weight) |
|---|---|
| A | 94% of distilled $(CH_3)_3BO_3$ and 6% of $(CH_3)_4SiO_4$. |
| B | 88% of distilled $(CH_3)_3BO_3$ and 12% of $(CH_3)_4SiO_4$. |
| C | 91% of distilled $(CH_3)_3BO_3$ and 9% of $(CH_3)_4SiO_4$. |
| D | 97% of distilled $(CH_3)_3BO_3$ and 3% of $(CH_3)_4SiO_4$. |
| E | 80% of distilled $(CH_3)_3BO_3$ and 20% of $(CH_3)_4SiO_4$. |
| F | Standard paste flux (borosilicate glass). |

All welds made with volatile flux showed marked superiority in corrosion-resistance over those made with flux F. Results of the test indicate that more than 3% of the silicate in the mixture is preferable, and that 20% is undesirably high.

In another series of tests, high strength steel coupons were welded (brazed) with bronze welding rods of two different compositions, a selected portion of the welding gas being bubbled through the indicated mixtures of ethyl borate and methyl silicate, as follows:

Table 4

| Test | Flux | Rod | Tensile strength | Elongation | Remarks |
|---|---|---|---|---|---|
| | | | Pounds per square inch | Percent | |
| 1 | A | 1 | 50,000 | 35 | Dense fumes. |
| 2 | A | 2 | 58,000 | 35 | Slight fume. |
| 3 | B | 1 | 51,000 | 35 | Less fume. |
| 4 | B | 2 | 58,000 | 31 | Very little fume. |

The fluxes used were:
A—Distilled ethyl borate.
B—Distilled ethyl borate+20% by weight of methyl silicate.

The welding rods used had the approximate compositions:

No. 1—Copper 59% to 62%, tin 0.5% to 1.0%, remainder zinc.
No. 2—Copper 56% to 59%, tin 0.75% to 1.10%, silicon 0.02% to 0.1%, iron 0.75% to 1.25%, remainder zinc.

Rod No. 2 is of a composition designed to inhibit zinc fuming.

From these and other tests, it is clearly established that the incorporation of up to about 20% of methyl silicate with the volatile borate flux very definitely inhibits zinc fuming, which is such an objectional feature of brazing operations when welding rods containing zinc are used.

Bronze welds made in steel plate having a tensile strength of 63,000 pounds per square inch, employing as fluxes, distilled methyl borate; and the respective azeotropic mixtures of ethyl borate with ethanol, with methyl isobutyl ketone, and with perchlorethylene; and azeotropic mixtures of methyl borate with methanol, with acetone, and with acetonitrile—and similar welds produced by use of a 30% solution of ethyl borate in anhydrous ethanol—were readily made, and proved satisfactory in every way, being in many instances stronger than the plate itself. When using dry acetylene with these azeotropic mixtures, the fluxing action continued until substantially all of the mixture had been consumed.

The fluxing service of these compositions apparently is not impaired by the presence therein of volatile impurities, such as ethyl acetate, gasoline, and the like, often added to ethanol as denaturants; nor by traces therein of the benzene sometimes employed for dehydrating the alkyl borate following its production.

Table 5 provides a comparison of the characteristics of an azeotropic mixture of the invention with those of other types of active reaction mixtures containing an excess of reactants, upon distillation at atmospheric pressure:

Table 5

| Flux | Fraction distilled | Boiling range | Triethyl borate in vaporized fraction |
|---|---|---|---|
| | | Degree C. | Percent |
| 1 | Total charge: 1500 grams | | |
| | First, 250 c. c. | 76.5 | 25.4 |
| | Second, 250 c. c. | 76.5 | 25.2 |
| | Fourth, 250 c. c. | 76.5 | 25.2 |
| | Sixth, 250 c. c. | 76.5 | 25.1 |
| | Eighth, 250 c. c. | 76.5 | 25.7 |
| 2 | Total charge: 902 grams | | |
| | First, 25 c. c. | 64.8 | 10.6 |
| | Next, 300 c. c. | 64.8–67.8 | 10.6 to 21.3 |
| | Next, 200 c. c. | 67.8–68.6 | 21.3 to 27.2 |
| | Next, 150 c. c. | 68.6–80.0 | 27.2 to 33.3 |
| | Residue, 330 grams | | |
| 3 | Total charge: 200 c. c. | | |
| | First, 20 c. c. | 70.2–74.8 | 15.5 |
| | Third, 20 c. c. | 75.8–76.4 | 15.5 to 18.7 |
| | Fifth, 20 c. c. | 77.0–77.4 | 18.7 to 20.7 |
| | Seventh, 20 c. c. | 77.8–78.2 | 20.7 to 24.2 |
| | Ninth, 20 c. c. | 79.2–80.2 | 24.2 to 32.5 |
| | Tenth, 20 c. c. | 80.0–78.2 | 32.5 to 22.5 |

Flux 1 is a 25% solution of triethyl borate in anhydrous ethyl alcohol, prepared by dissolving 375 grams of pure triethyl borate of 99.6% purity in 1125 grams of ethyl alcohol.

Flux 2 is a reaction mixture containing triethyl borate, denatured ethyl alcohol, water, both solid and dissolved boric acid and boric oxide, prepared in accordance with the method recited on page 27 of the April 1929 issue of "Journal of American Welding Society," by mixing 205 grams of boric oxide with 726 grams of 95% denatured ethyl alcohol. After agitation of the mixture, the same was allowed to stand for 5 days.

Flux 3 is a reaction mixture prepared in manner similar to Flux 2, by mixing 217.7 grams of fused boric acid and 771 grams of denatured ethyl alcohol. A sample of the supernatant liquid and undissolved solids was distilled at atmospheric pressure during concurrent reaction between the components.

The term "azeotropic mixture" is employed herein to indicate not only a true azeotrope, which for any selected pressure has a fixed ratio of alkyl ester to volatile solvent, but also to indicate such a mixture substantially free from non-distillable solids and from which an azeotrope is distillable.

The term "distilled" is used in the specification and claims to designate an alkyl borate and/or alkyl silicate, or a mixture or solution thereof, that is substantially free from solid or non-volatilizable materials, such as boric oxide and/or silica, and boric acid and/or silicic acid. Such a borate or silicate generally is prepared by a distillation.

The term "a welding gas" is used in the specification and claims to designate either a fuel gas adapted for use in welding and/or brazing operations, such as acetylene, hydrogen, ethylene, propane and the like, or mixtures thereof; or a combustion-supporting gas such as oxygen; or an appropriate mixture of a fuel gas and a combustion-supporting gas. It is preferred to introduce the flux composition into the fuel gas prior to mixing the latter with the combustion-supporting gas.

This application is a continuation-in-part of our pending application, Serial No. 56,042, for improvement in "Volatile welding fluxes," filed December 24, 1935.

We claim:

1. As a composition of matter, an at least approximately azeotropic mixture of a distilled alkyl borate and a volatile organic solvent which forms an azeotropic mixture with said borate.

2. As a composition of matter adapted for use in welding or brazing metals, an azeotropic mixture of methyl alcohol and distilled methyl borate, said mixture containing about 73% of methyl borate.

3. As a composition of matter, an at least approximately azeotropic mixture of anhydrous ethyl alcohol and distilled ethyl borate, and containing at least about 25% of ethyl borate.

4. As a composition of matter, an azeotropic mixture of methyl alcohol and isopropyl borate, and containing about 32% of isopropyl borate.

5. As a composition of matter, a dry at least approximately azeotropic mixture of a distilled alkyl borate selected from the group consisting of methyl borate, ethyl borate and isopropyl borate, and substantially free from non-volatilizable materials, and a substantially anhydrous volatile solvent which forms an azeotropic mixture with said alkyl borate.

6. A volatile flux for use in welding and brazing metals, said flux consisting of at least one distilled dehydrated alkyl ester selected from the group consisting of methyl borate, ethyl borate and isopropyl borate, and at least one dehydrated alcohol selected from the group consisting of methyl alcohol and ethyl alcohol; the alkyl ester or esters constituting at least about 25% of said mixture.

7. A volatile flux for use in welding or brazing metals, said flux consisting of an approximately azeotropic mixture of a distilled dehydrated alkyl ester selected from the group consisting of methyl borate, ethyl borate and isopropyl borate; and a dehydrated alcohol selected from the group consisting of methyl alcohol and ethyl alcohol.

8. A volatile flux for use in welding or brazing metals, said flux consisting of an approximately azeotropic mixture of dehydrated methyl alcohol and a distilled dehydrated alkyl ester selected from the group consisting of methyl borate, ethyl borate and isopropyl borate.

9. A dry volatile flux for use in welding or brazing metals, said flux consisting of an approximately azeotropic mixture of methyl borate and a dehydrated alcohol selected from the group consisting of methyl alcohol and ethyl alcohol.

10. A volatile flux for use in welding or brazing metals, said flux consisting of distilled dehydrated methyl borate, and at least one dehydrated alcohol selected from the group consisting of methyl alcohol and ethyl alcohol; the methyl borate constituting at least about 25% of the said mixture.

11. A volatile flux for use in welding or brazing metals, said flux consisting of an approximately azeotropic mixture of distilled dehydrated methyl borate and dehydrated methyl alcohol.

12. A dry welding gas adapted for use in welding and brazing metals, said gas containing the vapors of a distilled alkyl borate, and being substantially free from non-volatilizable materials.

13. A dry welding gas adapted for use in welding and brazing metals, said gas containing distilled ethyl borate and ethyl alcohol, said borate and alcohol being substantially anhydrous and free from non-volatilizable materials.

14. A dry welding gas adapted for use in welding and brazing metals, said gas containing anhydrous distilled ethyl borate and anhydrous ethyl alcohol in approximately the ratio in which they exist in their azeotropic mixture.

15. A dry welding gas adapted for use in welding and brazing metals, said gas containing therein a dry mixture of a distilled alkyl borate and a volatile organic solvent forming azeotropes with said borate, the said borate and solvent being present in approximately azeotropic proportions.

16. Process for welding and brazing metals, which comprises supplying welding gases consisting of a dry fuel gas and a dry combustion-supporting gas to a welding zone to produce a welding flame; and introducing into at least one of said dry welding gases a dry volatile flux consisting of a mixture of a distilled anhydrous alkyl borate and an anhydrous volatile organic solvent for the borate adapted to form with the latter an azeotropic mixture.

17. Process for welding and brazing metals, which comprises supplying welding gases consisting of a fuel gas and a combustion-supporting gas to a welding zone to produce a welding flame; and passing at least one of said welding gases into intimate contact with a dry volatile flux consisting of an approximately azeotropic mixture of distilled ethyl borate and ethyl alcohol substantially free from boric oxide and boric acid.

18. Process for welding and brazing metals, which comprises supplying welding gases consisting of a fuel gas and a combustion-supporting gas to a welding zone to produce a welding flame; and introducing into at least one of said welding gases a volatile flux consisting of a dry approximately azeotropic mixture of distilled methyl borate and methyl alcohol.

19. A process for the preparation of trimethyl borate vapors which comprises passing a dry gas through a mixture of trimethyl borate and methyl alcohol.

20. A process for the preparation of alkyl borate vapors which comprises passing a dry gas through a mixture of an alkyl borate and corresponding alcohol.

ARTHUR R. LYTLE.
THOMAS H. VAUGHN.